United States Patent [19]

Weber et al.

[11] Patent Number: 5,315,800

[45] Date of Patent: May 31, 1994

[54] ANCHORING ROD FOR ANCHORING AN ARTICLE TO A BASE USING A SYNTHETIC RESIN

[75] Inventors: Wilfried Weber, Schopfloch-Unteriflingen; Rainer Mallee, Waldachtal 3/Tumlingen; Bernd Hein, Schönmünzach; Burkhard Mayer, Herrenberg-Gülstein; Harald Güth, Waldachtal; Manfred Haage, Dornstetten-Aach, all of Fed. Rep. of Germany

[73] Assignee: fischerwerke Artur Fischer GmbH & Co. KG, Waldachtal 3/Tumlingen, Fed. Rep. of Germany

[21] Appl. No.: 905,905

[22] Filed: Jun. 29, 1992

[30] Foreign Application Priority Data

Jun. 29, 1991 [DE] Fed. Rep. of Germany ....... 4121620

[51] Int. Cl.⁵ .......................... F16B 13/14; E04B 1/38
[52] U.S. Cl. ..................... 52/309.1; 52/704; 52/698; 411/82
[58] Field of Search ............. 52/698, 704, 309.1 OR; 411/82, 258, 930

[56] References Cited

U.S. PATENT DOCUMENTS

| | | | |
|---|---|---|---|
| 4,211,049 | 7/1980 | Fischer | 52/704 |
| 4,531,861 | 7/1985 | Kash | 52/704 |
| 4,631,889 | 12/1986 | Adam et al. | 52/704 |
| 4,656,806 | 4/1987 | Leibhard et al. | 52/704 |
| 4,747,727 | 5/1988 | Berchtold et al. | 52/704 |
| 4,840,524 | 6/1989 | Bisping et al. | 411/82 |
| 5,152,650 | 10/1992 | Kitagawa | 411/82 |

FOREIGN PATENT DOCUMENTS

| | | | |
|---|---|---|---|
| 0303551 | 2/1989 | European Pat. Off. | 411/82 |
| 0352226 | 1/1990 | European Pat. Off. | |
| 3516866 | 11/1986 | Fed. Rep. of Germany | |
| 3523477 | 1/1987 | Fed. Rep. of Germany | 52/704 |
| 398063 | 2/1966 | Switzerland | 52/704 |
| 916813 | 1/1963 | United Kingdom | 52/704 |
| 1351282 | 6/1970 | United Kingdom | 52/704 |

*Primary Examiner*—Carl D. Friedman
*Assistant Examiner*—Wynn E. Wood
*Attorney, Agent, or Firm*—Michael J. Striker

[57] ABSTRACT

The anchoring rod for anchoring an article to a base using a compounded mass including a synthetic resin, has a threaded portion at its rear end for fixing the article; a threaded nut engagable on the threaded portion for applying a mounting torque; a head having a shoulder facing toward the rear end, an outer surface tapering towards the front end of the anchoring rod and having a wedge-like tip at the front end; a conical portion connecting the head and the threaded portion and tapering toward the head; and a resilient annular washer bearing on the shoulder of the head.

11 Claims, 1 Drawing Sheet

ANCHORING ROD FOR ANCHORING AN ARTICLE TO A BASE USING A SYNTHETIC RESIN

BACKGROUND OF THE SPECIFICATION

The invention relates to an anchoring rod used for anchoring an article on a base by drilling a hole in the base, inserting a compounded mass including a synthetic resin and the anchoring rod into the drilled hole.

This type of anchoring rod is known and has a head at a front end inserted in the drilled hole and a threaded portion on a rear end protruding from the hole for fixing the article to the rear end of the anchored anchoring rod.

To anchor an anchoring rod using a compounded mass, first a drilled blind hole is made in the base, the diameter of the hole being somewhat larger than the outer diameter of the anchoring rod. A glass capsule that contains the compounded mass including a synthetic resin, a hardener and additives is then inserted into the drilled hole. The capsule is crushed by insertion of the anchoring rod clamped in a drilling machine and the components of the compounded mass are activated by mixing. Once the compounded mass has hardened, the anchoring rod is firmly bonded and anchored in the drilled hole. The anchoring is based essentially on the adhesive bond between the compounded mass and the wall of the drilled hole. This bond is considerably weakened, however, when a crack runs through the location of the anchor. The compounded mass becomes detached at the wall of the drilled hole because of the drilled hole enlarging as a consequence of the crack so that only negligible holding forces remain.

Therefore DE-OS 35 16 866 describes an anchoring rod for use with synthetic resin which is provided at its front end with a head that is positionable in the vicinity of an undercut in the drilled hole as the anchoring rod is anchored. A positive engagement is thereby achieved in the region of the undercut, which enables tensile forces to be tolerated, even when a crack develops. The pull-out force, however, is largely based on the positive engagement in the undercut, so that in cracked concrete there is a considerable decline in the performance of the anchor. Furthermore, this known process requires a drilled hole with an undercut, the preparation of which requires special drilling tools.

EP-A-O 352 226 describes an anchoring means for anchoring in a cylindrical drilled hole including an anchoring rod provided with an end having an expansible cone. A parting agent is applied to the head and the shank of the anchoring rod which is intended to prevent the compounded mass from adhering to the anchoring rod. When a crack in the base occurs, the mortar compound becomes detached from the anchoring rod so that the bond between the mortar mass and the wall of the drilled hole is maintained. Subsequent slipping of the head of the anchoring rod provided with the expansible cone is intended to compensate for enlargement of the internal bore of the hardened mortar plug. When the anchoring rod is stressed, however, expansion forces are generated by the expansible cone expanding in the direction of the bottom of the drilled hole, which is precisely what is to be avoided in anchorings with composite anchors. Furthermore, there is a danger that the parting layer will be rubbed off or damaged as the composite anchor is driven in so that the desirable effect of subsequent slipping does not occur.

SUMMARY OF THE INVENTION

It is an object of the present invention to provide an anchoring rod anchored in a drilled hole in a base by a compounded mass including a synthetic resin that has a high pull-out force even when the base is concrete and is cracked in the vicinity of the anchor.

It is also an object of the present invention to provide an anchoring rod for use with a synthetic resin which provides an anchoring free from expansion pressure.

These objects and others which will be made more apparent hereinafter are attained in an anchoring rod having a head at a front end inserted in the drilled hole and a threaded portion on a rear end protruding from the hole for fixing the article to the rear end of the anchored anchoring rod.

According to the invention the anchoring rod of the above described type has a conical portion tapering toward the head and a resilient annular washer arranged on a shoulder of the head facing the conical portion.

To position the anchoring rod according to the invention, the rod is inserted into a cylindrical drilled hole, in which there is a resin cartridge, using a hammer drill. When the resin has hardened, the mounting torque is applied to the anchoring rod. As it is applied, the resilient washer arranged on the shoulder area of the head is compressed somewhat so that by slight axial displacement of the anchoring rod towards the mouth of the drilled hole the conical portion of the anchoring rod is detached from the cone of the mortar plug molded on the conical portion. There is thus no longer any bond between the conical portion of the anchoring rod and the compounded mass so that when a crack forms the adhesive bond between the mortar plug and the wall of the drilled hole is maintained. Because the head is bonded into the mortar plug with a positive fit, the full holding force of the anchoring is maintained, even in a cracked concrete base. The head of the anchoring rod generates neither an expansion force nor is a subsequent slipping of the anchoring rod required, which in itself would lead to a reduction of the clamping force on the article to be fixed.

The washer, which preferably is made of plastic material, can either be applied by adhesion or by injection. If the washer is in the form of an open ring, it is possible to slip on the washer over the conical portion.

To ensure that the mortar plug does not become detached from the wall of the drilled hole when a crack forms and the crack runs transversely as far as the anchoring rod, it is advantageous to provide the washer with several axially parallel ribs bearing on the conical portion. The ribs form parting planes in the mortar plug which influence the course taken by the cracks.

An inclined shoulder of the head and a washer having a shape fitting the inclined face are also able to promote the course taken by cracks developing transversely through the mortar plug. The inclined face of the head produces a nicking action directed outwards from the anchoring rod.

To ensure that the outer surface of the head becomes detached when the mounting torque is applied to the anchoring rod, the outer surface of the head is formed so that it tapers towards the front end.

A wedge-like tip arranged at the end face of the head facilitates crushing of the glass capsule containing the resin. Furthermore, the faces of the wedge-like tip serve as means preventing the anchoring rod from rotating as the mounting toque is applied.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
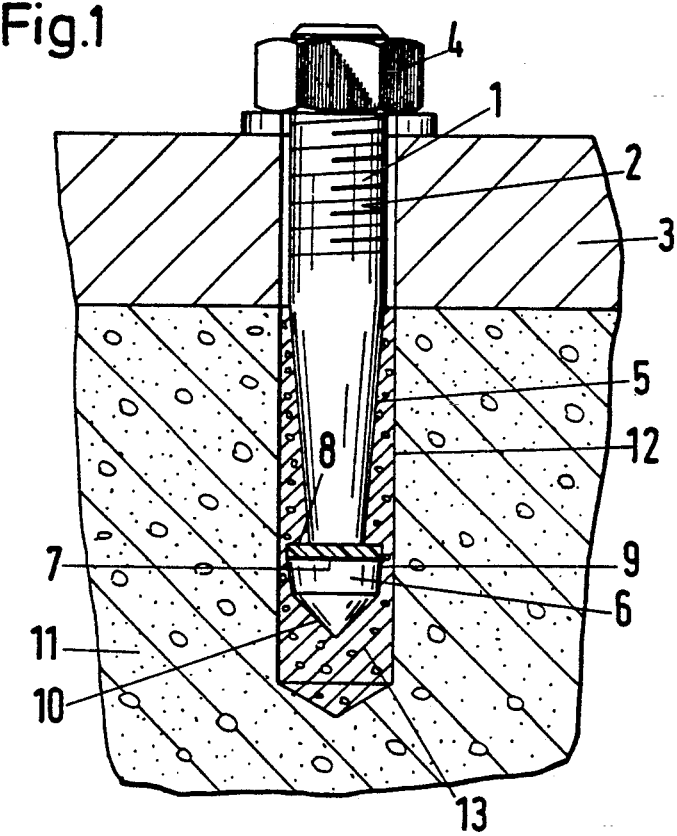
FIG. 1 is an axial cross-sectional view through an anchoring rod according to the invention anchored using a compounded mass including synthetic resin in a cylindrical drilled hole to a base.

The anchoring rod 1 shown in FIG. 1 has an external threaded portion 2 on a rear end thereof onto which a threaded nut 4 can be screwed to fix an article 3. Adjoining the threaded portion 2 is a conical portion 5 which tapers towards the head 6 at a front end of the anchoring rod 1. The head has a shoulder 7 against which a resilient washer 8 bears. The resilient washer 8 is preferably made of a plastic material, which is compressible at a certain pressure. The outer surface 9 of the head 6 is formed so that it is slightly conical tapering towards the front end of the head. The front end of the head 6 is provided with a roof-shaped, wedge-like tip 10, which crushes the glass capsule containing the compounded mass.

To anchor the anchoring rod 1, a cylindrical drilled hole 12 is made in a base 11. After inserting the glass capsule containing the resin, the hardener and, optionally, fillers, the anchoring rod 1 is driven into the drilled hole 12 using a hammer drill. The glass capsule is crushed by the wedge-like tip 10 and at the same time the components of the compounded mass 13 are activated as they are blended by the faces formed by the wedge-like tip.

When the setting process is complete and the compounded mass has hardened, the article 3 to be fixed is pushed on over the threaded portion 2 of the anchoring rod 1 projecting beyond the base component 11 and clamped using nut 4. The mounting torque applied with the nut 4 exerts on the anchoring rod a tensile force that leads to a slight axial displacement of the anchoring rod 1. This displacement is made possible by the resilient and/or plastic deformability of the washer 8 made of plastic material.

Figure 2:
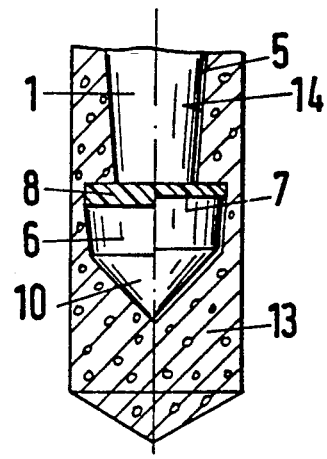
FIG. 2 is a cutaway cross-sectional view of the anchoring rod of FIG. 1 showing a front region of the anchoring rod before and after the mounting torque has been applied.

The left-hand half of the illustration in FIG. 2 shows the front region of the anchoring rod 1 prior to application of the mounting torque and the right-hand half of the illustration shows the front region after application of the mounting torque. The resulting tensile force that occurs compresses the washer 8 so that the anchoring rod undergoes a slight axial displacement. The tapering portion 5 and also the tapering outer surface of the head 6 are thereby detached from the wall 14 of the mortar plug 13 to the extent that a small gap forms. The full-out force of the anchoring rod is the result of fixing of the head 6 in the compounded mass. Because of the separation of the anchoring rod and the compounded mass, when a crack forms, the adhesive bond between the mass and the wall of the drilled hole is maintained. The shearing stresses originating from the head 6 of the anchoring rod 1 are thus taken up by the adhesive bond with the wall of the drilled hole.

Figure 3:
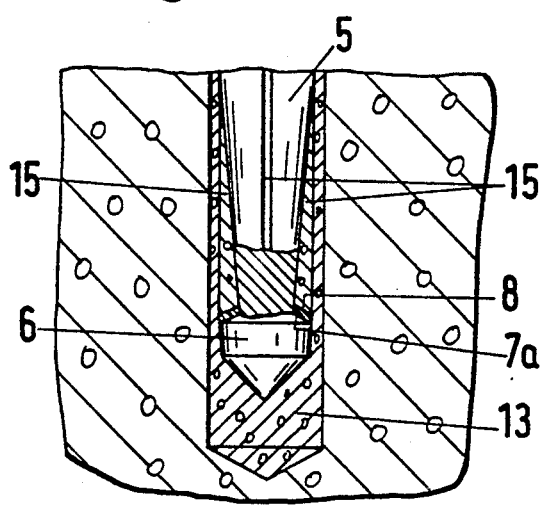
FIG. 3 is an axial cross-sectional view through another embodiment of an anchoring rod according to the invention.

In the embodiment illustrated in FIG. 3, the shoulder 7 of the head 6 is inclined slightly in an outward direction, i.e. it widens toward the head 6 from the tapering portion 5. This results in a nicking action going out from the tapering portion 5, which promotes breaking open of the mortar plug 13, when a crack forms. Additionally the axial parallel ribs 15 arranged on the washer 8, which lie with their rear side against the conical portion 5, provide predetermined break points, which likewise facilitate breaking of the mortar plug 13.

While the invention has been illustrated and described as embodied in an anchoring rod for anchoring an article to a base using a synthetic resin, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. An anchoring rod for anchoring an article to a base using a compounded mass including a synthetic resin, the anchoring rod having a rear end and a front end and comprising a threaded portion at the rear end thereof for fixing the article; a head at the front end, the head having a shoulder facing toward the rear end; a conical portion connecting the head and the threaded portion and tapering toward the head; and a resilient annular washer bearing on the shoulder of the head.

2. An anchoring rod according to claim 1, wherein the washer comprises an open plastic ring so that the washer can be is slipped over the conical portion so as to bear on the shoulder.

3. An anchoring rod according to claim 1, further comprising a plurality of ribs extending axially and bearing on the conical portion, the ribs being molded on the washer.

4. An anchoring rod according to claim 1, wherein the shoulder of the head has an inclined face and the washer is shaped to fit the inclined face.

5. An anchoring rod according to claim 1, wherein the head has an outer surface tapering towards the front end.

6. An anchoring rod according to claim 1, wherein the head has a wedge-like tip at the front end.

7. An anchoring rod according to claim 1, further comprising a threaded nut engaged on the threaded portion for applying a mounting torque.

8. An anchoring rod for anchoring an article to a base using a compounded mass including a synthetic resin, the anchoring rod having a rear end and a front end and comprising a threaded portion at the rear end thereof for fixing the article; a threaded nut engageable on the threaded portion for applying a mounting torque; a head at the front end and having a shoulder facing toward the rear end, an outer surface of the head tapering towards the front end and the head having a wedge-like tip at the front end; a conical portion connecting the head and the threaded portion and tapering toward the head; and a resilient annular washer bearing on the shoulder of the head.

9. An anchoring rod according to claim 8, further comprising a plurality of ribs extending axially and bearing on the conical portion, the ribs being molded on the washer.

10. An anchoring rod according to claim 9, wherein the shoulder of the head has an inclined face and the washer is shaped to fit the inclined face.

11. An anchoring rod according to claim 8, wherein said resilient annular washer comprises an open plastic ring.

* * * * *